July 31, 1962 L. A. PRATT 3,047,044

CIRCULAR DIE SETS

Filed March 7, 1960

LEMUEL A. PRATT,
INVENTOR.

BY Spensley and Horn

ATTORNEYS.

3,047,044

CIRCULAR DIE SETS

Lemuel A. Pratt, Los Angeles, Calif., assignor to Pacific Semiconductors, Inc., Culver City, Calif., a corporation of Delaware Filed Mar. 7, 1960, Ser. No. 13,033
4 Claims. (Cl. 153—9)

This invention pertains to metal forming devices and more specifically to dies for bending the metallic leads of electronic components to predetermined configurations.

In the mass production of electronic assemblies it is frequently desirable to mechanically preform the leads of resistors, conductors, diodes and other electronic components to certain predetermined confiurations. This can conveniently be accomplished through the use of forming dies having complementary faces between which the leads are pinched as the die faces are moved into cooperation with each other. The dies currently in use are usually in the form of a pair of rectangular blocks of suitable metal, each block having an edge surface providing a desired complementary die face configuration, or in the form of a pair of stacked layers of metal sheets having edges in staggered alignment to form complementary die faces. Such dies are relatively expensive to manufacture and have been found to wear quite rapidly when in extensive production line use. In addition, the necessary frequent replacement of such dies to get the individual segments in proper position to reproduce the predetermined configuration with accuracy is relatively time consuming, thereby increasing production costs in accordance with the period of inactivity of the machine in which the dies are used.

It is therefore an object of the present invention to provide improved dies for bending the metallic leads of electronic components and the like to predetermined configurations.

It is also an object of the present invention to provide inexpensive and long lasting dies for bending the metallic leads of electronic components and the like to predetermined configurations.

It is a further object of the present invention to provide dies for bending the metallic leads of electronic components and the like to predetermined configurations, the dies being easily adjustable to compensate for wear.

It is a still further object of the present invention to provide easily maintainable metal forming devices capable of relatively constant operation for bending the metallic leads of electronic components and the like to predetermined configurations.

The novel features which are believed to be characteristic of the invention, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Figures 1, 6:
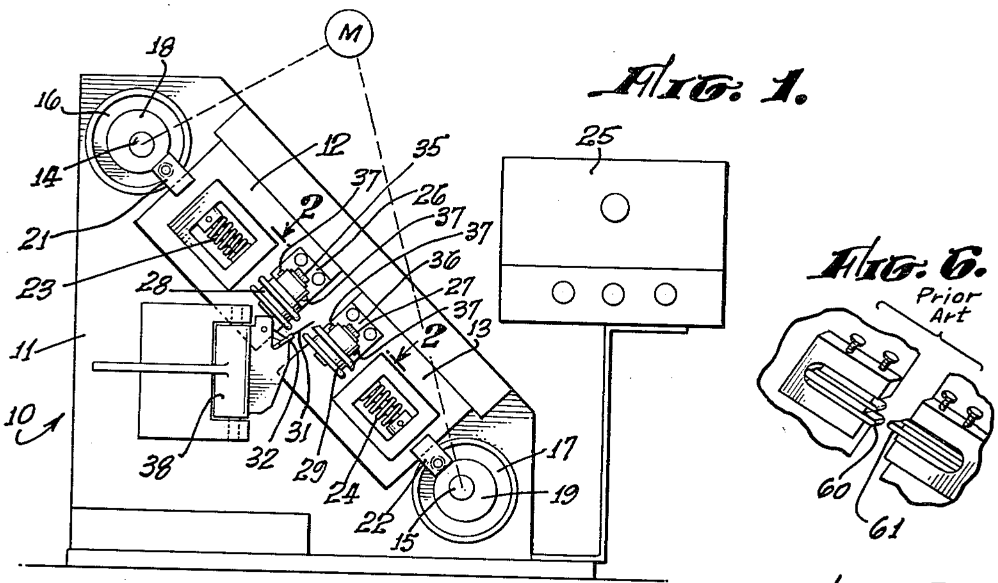
FIGURE 1 is an elevational view of a lead bending machine utilizing the forming dies of the present invention.
FIGURE 6 shows a typical prior art rectangular die set of the staggered layer type construction.

With reference to the drawing, the invention is illustrated as being incorporated in a lead bending machine indicated generally by the reference character 10. As illustrated in FIGURE 1, the machine comprises a supporting base enclosure 11 to which is slidably mounted a pair of die block carriages 12 and 13. Mounted within base enclosure 11 is an electric drive motor, M, mechanically coupled to a pair of shafts 14 and 15 protruding from the base enclosure 11 and rotatably supported thereby through a pair of bearing sets 16 and 17, respectively. Eccentrically attached to the protruding ends of shafts 14 and 15 are a pair of circular driving cams 18 and 19, respectively. Cam followers 21 and 22, fastened to the ends of the carriages 12 and 13, respectively, are positioned in contact with the peripheral surfaces of the driving cams 18 and 19 and held in contact therewith by springs 23 and 24, respectively. The driving cams 18 and 19 are so positioned to cause the synchronized cyclical linear movement of the carriages 12 and 13 toward and away from each other.

Figure 3:
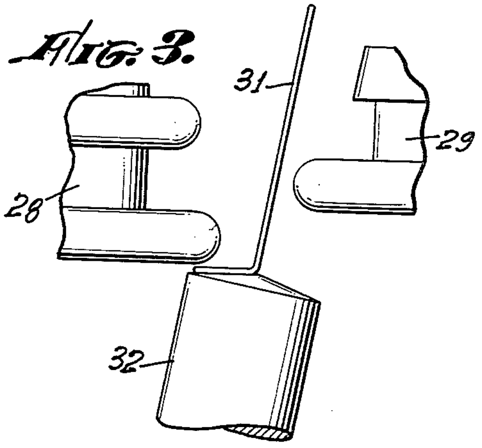
FIGURE 3 shows a thin wire lead positioned between the complementary faces of the dies of the present invention when the die faces are separated from each other.
Figure 4:
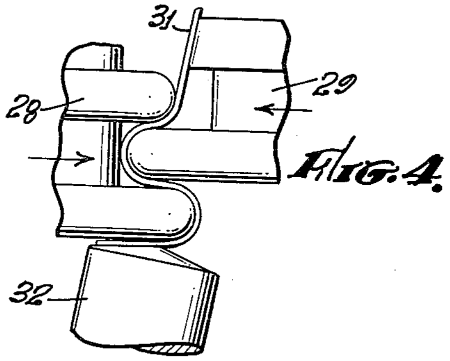
FIGURE 4 shows the thin wire lead bent into a predetermined cat's whisker configuration by movement of the complementary die faces into close cooperation with each other.
Figure 5:
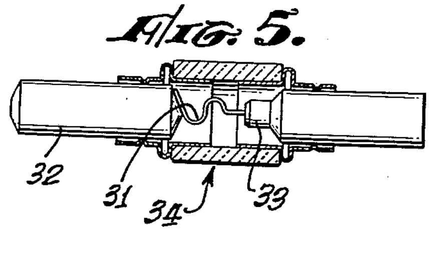
FIGURE 5 shows the resulting cat's whisker lead in use as a contact for a semiconductor diode.

Momentarily referring now to FIGURE 5, suppose it is desired to bend a thin wire electrical lead 31, extending from the tip of a cylindrical conductor 32, into the cat's whisker configuration shown for connection to the surface of a semiconductor material 33 and ultimate encapsulation by container 34. To bend the lead 31 into such a configuration by pinching it between die blocks requires die blocks having complementary faces such as those shown in FIGURES 3 and 4, preferably of high carbon steel. In FIGURE 3 there is shown the electrical lead 31 positioned between circular die block faces constructed in accordance with the present invention, which are then moved together in close cooperation, as shown in FIGURE 4, to bend the lead into the desired configuration. Prior art die blocks having such complementary faces are shown in FIGURE 6. Such blocks would be rigidly mounted in die block mounting supports fastened to the movable carriages of a machine such as that herein designated by the reference character 10, where, during normal machine operation the die faces 60 and 61 would be periodically moved into close cooperation with each other by the cyclical linear movements of the carriages.

Figure 2:
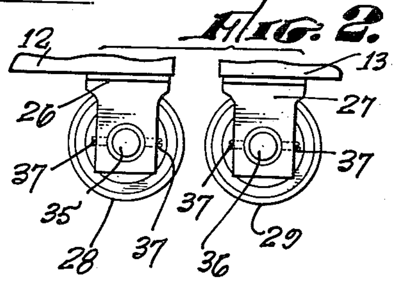
FIGURE 2 is an elevational view of the dies of the present invention as incorporated in the machine of FIGURE 1, and taken along the line 2—2 of FIGURE 1.

In accordance with the present invention the same principles of operation are utilized; however, cylindrical die blocks having circumferential surfaces forming circular continuous die faces are utilized instead of rectangular die blocks having only single die faces. Referring back to FIGURE 1, die block mounting supports 26 and 27 are fastened to the carriages 12 and 13 near the carriage ends closest to each other. Cylindrical die blocks 28 and 29, having circumferential surfaces presenting continuous complementary die faces of the desired configuration, are rotatably mounted to the supports 26 and 27 by means of spindles 35 and 36 which pass through holes in the supports 26 and 27 and through holes in the blocks 28 and 29 coextensive with their central axes, and which are capped at each end. During normal machine operation rotational movement of the cylindrical die blocks 28 and 29 is prevented by a series of set screws 37 (see FIGURE 2), threaded into the supports 26 and 27 to contact the spindles 35 and 36. When wear of the contacting die faces is noticed it is merely necessary to loosen the series of set screws 37 and slightly rotate the cylindrical die blocks 28 and 29 to new positions and lock them in place again by retightening the set screws 37. In practice it has been found that an angular displacement of 1° is sufficient to present a new unworn die face, thereby enabling reuse of the dies of the present invention over 300 times by rotating them about 1° whenever wear is noted. An increase in die life of 300 times not only reduces die costs but also drastically reduces the time the machine would otherwise be inactivated while changing the dies some 300 times.

As shown in FIGURE 1, a feed device 38 is also mounted to the base enclosure 11 of the machine 10. The feed device 38 is also synchronized with the movements of the carriages 12 and 13 to successively position the pins 32 carrying the electrical leads between the die blocks 28 and 29 to be pinched as the die faces move into close cooperation with each other. In the illustrated device of FIGURE 5, the electrical lead is positioned so the lead will be bent only in a single plane. However, compound three-dimensional bends can be formed by varying the direction and angle at which the lead is inserted between the faces of the cylindrical blocks 28 and 29.

Although the present invention has been described with a certain degree of particularity, it is to be understood that the present disclosure has been made only by way of example and that numerous changes in the details of construction and the combination and arrangement of parts may be resorted to without departing from the spirit and scope of the invention as hereinafter claimed.

What is claimed is:

1. In a machine for bending the leads of electronic components to a predetermined configuration, the combination of: first and second die block carriages synchronized for cyclical linear movement toward and away from each other; first and second cyclindrical die blocks, the peripheral surface of said first cylindrical die block presenting a continuous die face formed by a surface of revolution generally of said predetermined configuration, the peripheral surface of said second cylindrical die block presenting a continuous die face at least partially complementary to the die face of said first cylindrical die block, said cylindrical die blocks being adapted to be mounted for rotation about their central axes; and, mounting means on said carriages to which said die blocks are rotatably mounted with their central axes in parallel alignment, one die block being so secured to each of said carriages, said mounting means including disengageable securing means which when engaged with said die blocks prevent their rotational movement and which when disengaged from said die blocks allow said die blocks to be rotated to different angular positions, said securing means being engaged with said die blocks during normal machine operation.

2. In a machine for bending the leads of electronic components to a predetermined configuration, the combination of: first and second die block carriages synchronized for cyclical linear movement toward and away from each other; first and second cylindrical die blocks, the peripheral surface of said first cylindrical die block having circumferentially uniform projections and recesses to present a continuous die face substantially of said predetermined configuration, the peripheral surface of said second cylindrical die block having circumferentially uniform recesses and projections generally corresponding to the circumferential projections and recesses in the peripheral surface of said first cylindrical die block to thereby form a continuous die face at least partially complementary to the continuous die face of said first cylindrical die block, said die blocks being adapted to be mounted for rotation about their central axes; and, mounting means on said carriages to which said die blocks are rotatably mounted with their central axes in parallel alignment, one die block being so secured to each of said carriages, said mounting means including disengageable securing means which when engaged with said die blocks prevent their rotational movement and which when disengaged from said die blocks allow said die blocks to be rotated to different angular positions, said securing means being engaged with said die blocks during normal machine operation.

3. In a machine for bending the leads of electronic components, the combination of: first and second die block carriages synchronized for cyclical movement toward and away from each other; first and second cylindrical die blocks, the peripheral surface of said first cylindrical die block having circumferentially uniform projections and recesses to present a continuous die face of a first predetermined configuration, the peripheral surface of said second cylindrical die block having circumferentially uniform recesses and projections to present a continuous die face of a second predetermined configuration at least partially complementary to the continuous face of said first cylindrical die block, said die blocks being adapted to be mounted for rotation about their central axes; and, mounting means on said carriages to which said die blocks are rotatably mounted with their central axes in a predetermined alignment, one die block being so secured to each of said carriages, said mounting means including disengageable securing means which when engaged with said die blocks prevent their rotational movement and which when disengaged from said die blocks allow said die blocks to be rotated to different angular positions, said securing means being engaged with said die blocks during normal machine operation.

4. In a machine for bending the leads of electronic components, the combination of: first and second die block carriages synchronized for cyclical movement toward and away from each other; first and second cylindrical die blocks, the peripheral surface of said first cylindrical die block having circumferentially uniform projections and recesses to present a continuous die face of a predetermined configuration, the peripheral surface of said second cylindrical die block having circumferentially uniform recesses and projections generally corresponding to the circumferential projections and recesses in the peripheral surface of said first cylindrical die block to thereby form a continuous die face at least partially complementary to the continuous die face of said first cylindrical die block, said die blocks being adapted to be mounted for rotation about their central axes; and, mounting means on said carriages to which said die blocks are rotatably mounted with their central axes in parallel alignment, one die block being so secured to each of said carriages, said mounting means including disengageable securing means which when engaged with said die blocks prevent their rotational movement and which when disengaged from said die blocks allow said die blocks to be rotated to different angular positions, said securing means being engaged with said die blocks during normal machine operation.

References Cited in the file of this patent

UNITED STATES PATENTS

| | | |
|---|---|---|
| 903,224 | Norden | Nov. 10, 1908 |
| 1,810,342 | Bulger | June 16, 1931 |
| 2,312,225 | Wilkinson | Feb. 23, 1943 |
| 2,835,282 | Schmuldt | May 20, 1958 |